(12) United States Patent
Meixner

(10) Patent No.: US 8,588,707 B2
(45) Date of Patent: Nov. 19, 2013

(54) REFERENCE FREQUENCY CONTROL IN MULTI-MODAL DEVICES

(75) Inventor: Michael Meixner, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1566 days.

(21) Appl. No.: 12/031,599

(22) Filed: Feb. 14, 2008

(65) Prior Publication Data

US 2009/0209251 A1 Aug. 20, 2009

(51) Int. Cl.
*H04B 1/40* (2006.01)
(52) U.S. Cl.
USPC ............................................. 455/75; 455/147
(58) Field of Classification Search
USPC ............... 455/427, 426.1, 517, 12.1, 67.16,
455/436–444, 75, 147, 76, 141, 255–265,
455/67.11, 445; 367/90, 94, 904; 370/516,
370/330–331; 342/358

See application file for complete search history.

(56) References Cited

U.S. PATENT DOCUMENTS

| | | | |
|---|---|---|---|
| 5,663,735 A * | 9/1997 | Eshenbach | 342/357.62 |
| 5,742,908 A * | 4/1998 | Dent | 455/517 |
| 6,041,222 A * | 3/2000 | Horton et al. | 455/255 |
| 6,965,753 B1 * | 11/2005 | Miller et al. | 455/12.1 |
| 2002/0039381 A1 * | 4/2002 | Dooley et al. | 375/147 |
| 2007/0058683 A1 * | 3/2007 | Futami et al. | 370/516 |

\* cited by examiner

*Primary Examiner* — Charles Appiah
*Assistant Examiner* — Alexander Yi
(74) *Attorney, Agent, or Firm* — Eschweiler & Associates, LLC

(57) ABSTRACT

The present disclosure relates to methods, systems and devices for shifting a reference frequency from a first value to a second value, the shifting characterized at least in part by a controlled transition of the reference frequency at a predetermined time-rate-of-change.

20 Claims, 4 Drawing Sheets

REFERENCE FREQUENCY CONTROL IN MULTI-MODAL DEVICES

BACKGROUND

Multi-modal wireless devices are increasingly prevalent in both business and personal applications. One illustrative class of multi-modal devices includes cellular communications (e.g., voice and text, etc.) and global positioning system (GPS) capabilities in an integrated portable form. Such devices depend on wireless signal services provided by an external system or network in order to operate. Furthermore, when a multi-modal device is in mobile operation, it is often necessary to transfer between geographically-fixed wireless service areas (e.g., cellular zones, Wi-Fi® hot spots, etc.) in order to maintain continuous service.

Thus, a multi-modal device must be capable of handling the transition between service zones in terms of any changes that occur in the corresponding wireless signals, or an interruption in service may result. One common zone-transfer issue is that of Doppler shift in the operating frequency used by the portable multi-modal device and the corresponding wireless service resources. Other phenomena, such as temperature drift and component aging, affect the performance of multi-modal devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Disclosed herein are devices and methods for use with multi-modal wireless systems.

According to one implementation, a method includes operating a wireless device using a reference frequency at a first value. The method also includes shifting the reference frequency from the first value to a second value. The shifting is characterized, at least in part, by a ramping of the reference frequency at a predetermined time-rate-of-change. The predetermined time-rate-of-change corresponds to an operating tolerance of the wireless device. The method further includes operating the wireless device using the reference frequency at the second value.

According to another implementation, a method includes receiving signals corresponding to a wireless operating frequency. The method also includes adjusting an oscillator in accordance with the signals, so as to transition from a first reference frequency to a second reference frequency. The transition is performed in accordance with a determined time-rate-of-change.

According to still another implementation, a device includes an antenna configured to receive wireless signals. The device also includes an oscillator configured to provide a reference frequency. The device includes a subsystem configured to use the wireless signals and to operate responsive to the reference frequency. The device further includes control logic that is configured to shift the reference frequency from a first value to a second value in accordance with a time-rate-of-change. The control logic is further configured such that the shift in the reference frequency is performed in accordance with the wireless signals.

In yet another implementation, an electronic circuit includes control logic configured to receive a signal corresponding to a wireless signal. The control logic is also configured to provide a tuning voltage in accordance with the signal. The tuning voltage is configured to shift an oscillator from a first reference frequency output value to a second reference frequency output value. The tuning voltage is characterized, at least in part, by a linear ramping in accordance with a determined time-rate-of-change.

Circuits and functional aspects provided herein can be fabricated, at least in part, on a common substrate such that one or more respective integrated circuit devices are defined. In one or more implementations, at least a portion of the functional subject matter presented herein can be fabricated within a 65 nanometer (or smaller) environment.

The techniques described herein may be implemented in a number of ways. Illustrative context is provided below with reference to the included figures and ongoing discussion.

Illustrative Operating Environment

Figure 1:
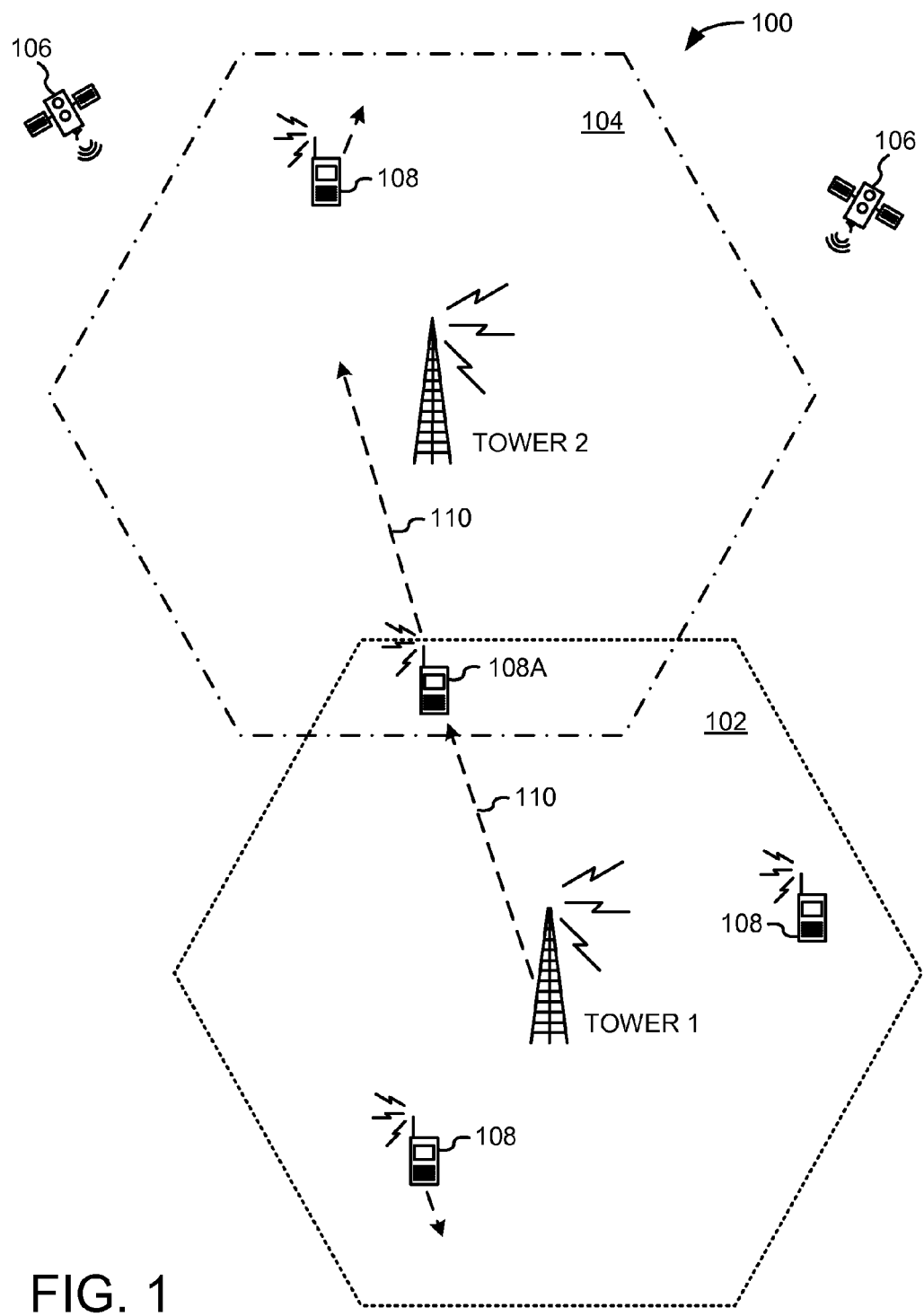
FIG. 1 is a diagrammatic view depicting an illustrative operating environment.

FIG. 1 is a diagrammatic view depicting an illustrative operating environment or scenario 100. The scenario 100 is illustrative and not intended to be limiting in nature and is provided in the interest of clarity and understanding of the present teachings. The scenario 100 includes a first cellular service zone 102 and a second cellular service zone 104. Each of the cellular service zones 102 and 104 is assumed to provide cellular communication (wireless) services within a respective geographic coverage area. As depicted, each of the cellular coverage areas 102 and 104 is represented as hexagonal in shape. However, it is to be appreciated that such hexagonal regions are non-limiting and are a simplification presented in the interest of clarity. The scenario 100 also includes a plurality of global positioning system (GPS) satellites 106. The GPS satellites 106 provide wireless signals that can be received and used to determine geographic location. In any case, the GPS satellites 106 are illustrative of another wireless service accessible by way of appropriately enabled devices.

The scenario 100 also includes a number of wireless devices (devices) 108. Any one or more of the wireless devices can also be defined as a multi-modal device. Thus, the devices 108 can respectively include cellular capabilities, GPS capabilities, wireless local area network (WLAN) capabilities, Wi-Fi® capabilities, etc., or any plurality of these or other wireless capabilities (i.e., operating modes). For example, the device 108A is assumed to have at least cellular communications and GPS locating functions, in addition to possible other wireless operating modes.

For purposes of non-limiting example, the device 108A is assumed to traverse a path 110 out of the first cellular service zone 102 and into the second cellular service zone 104. It is further assumed that the device 108A is being transported by an automobile (not shown) that is traveling at about 160 km/hour (approximately 100 miles/hour) directly away from "TOWER 1" within the cellular service zone 102. As a result, a Doppler shift (i.e., apparent displacement) is present in the operating frequency of the wireless signal carrier within cellular service zone 102. This illustrative Doppler shift corresponds to approximately 0.15 ppm change in the apparent operating frequency. The device 108A is presumed to have accommodated this Doppler shift by appropriate internal adjustment. However, the device 108A will experience another shift in operating frequency when transitioning from service zone 102 to service zone 104, as a result of the different approach vector with respect to "TOWER 2". In turn, the apparent change in operating frequency will require the device 108A to make appropriate internal accommodations in order to transition into service zone 104 without a user-perceivable interruption in cellular communications service. One way in which such Doppler shift-related transitions can accommodated is by way of adjustments to an internally generated reference frequency used by cellular and other subsystems of the device 108A.

Figure 2A:
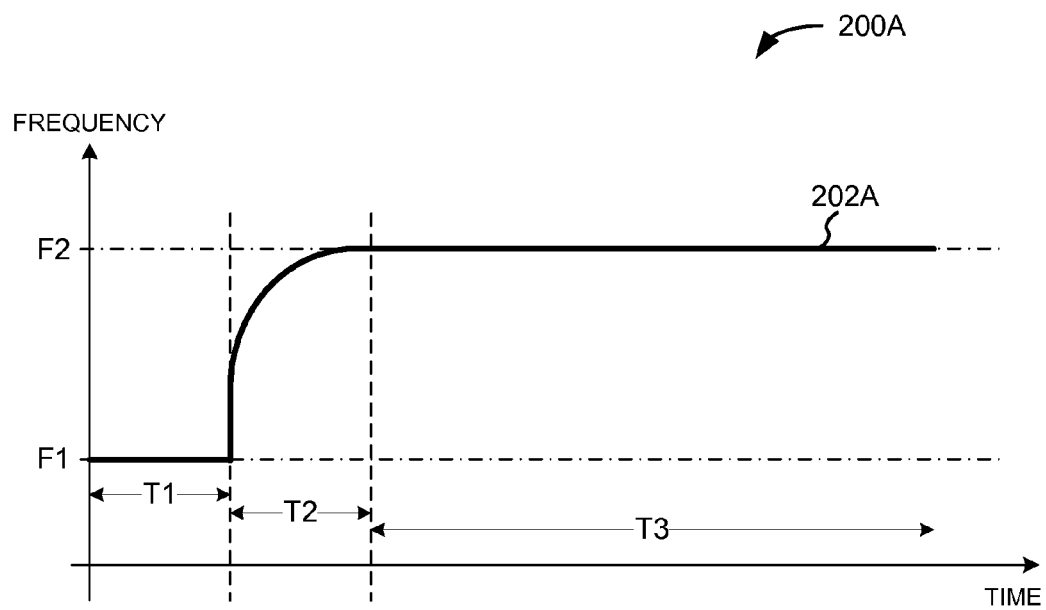
FIG. 2 is a signal diagram depicting illustrative reference frequency signals.

FIG. 2A shows an illustrative signal graph 200A. The graph 200A includes a reference frequency signal curve (curve) 202A. It is assumed, for purposes of non-limiting illustration, that the device 108A is operating with an internal reference frequency of value "F1" during time period "T1" so as to accommodate (i.e., correct for) the Doppler shift in the cellular carrier frequency within service zone 102. Then, during time period "T2", the device 108A makes a step change (or nearly so) in reference frequency to value "F2", in order to accommodate the transition to cellular service zone 104. The curve 202 indicates stabilization and operational equilibrium at the new frequency F2 during time period "T3".

It is presumed, for purposes of example, that the relatively rapid shift in the reference frequency curve 202A enables device 108A to maintain cellular communications with no loss of service perceivable to the user. However, it is also desirable to maintain continuous use of the GPS locating functions of the device 108A during the transition between zones 102 and 104. It is further assumed that the (approximate) step change in reference frequency during time period T2 is so abrupt that the GPS subsystem of the device 108A experiences a disruption in operation. This is due to the common use made by the GPS subsystem and the cellular subsystem to the reference frequency signal, in combination with performance limitations of the GPS subsystem itself.

First Illustrative Implementation

Figure 3:
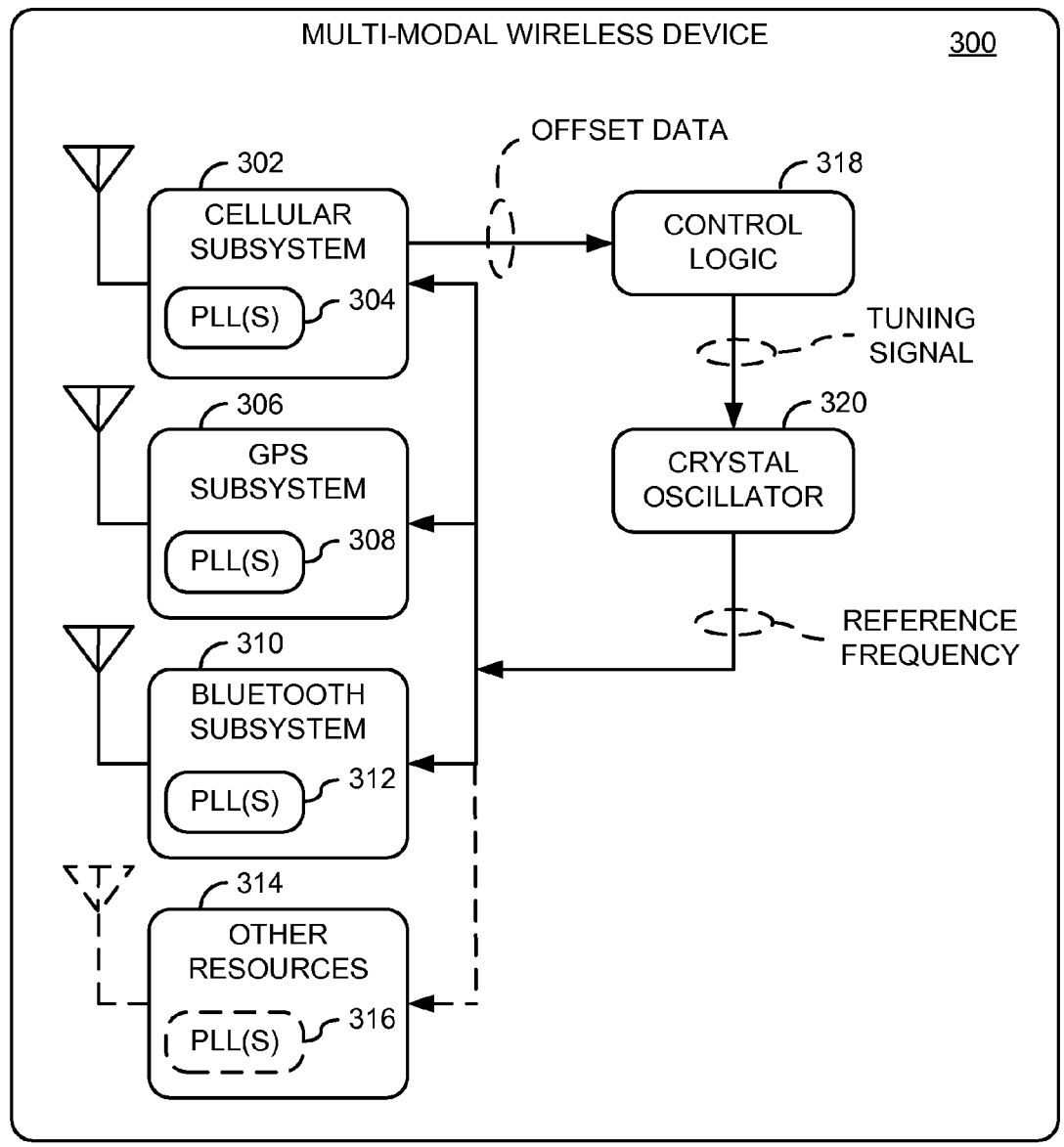
FIG. 3 a block diagram depicting an illustrative multi-modal device in accordance with the present teachings.

FIG. 3 depicts an illustrative multi-modal wireless device (MMWD) 300 in accordance with one implementation of the present teachings. The MMWD 300 is illustrative and non-limiting with respect to the present teachings. Other multi-modal devices may also be defined and used including and/or omitting depicted (or other) features and resources relative to the MMWD 300 in accordance with the present teachings.

The MMWD 300 includes a cellular subsystem 302. The cellular subsystem 302 includes circuitry and other resources so as to provide a range of cellular telecommunications functions. For example, the cellular subsystem 302 can be defined and configured to enable voice, text, and/or photo images to be communicated to and from the MMWD 300. The cellular subsystem 302 further includes one or more phase-locked loops (PLL(s)) 304 configured to provide oscillating signals as needed during normal operations.

The MMWD 300 also includes a GPS subsystem 306. The GPS subsystem 306 includes circuitry and resources so as to provide geographic locating and related functions in accordance with global positioning technology. The GPS subsystem 306 is understood to operate in accordance with GPS satellites (e.g., 106) and/or other corresponding resources. The GPS subsystem 306 includes one or more PLL(s) 308 configured to provide oscillating signals.

The MMWD 300 also includes a Bluetooth subsystem 310. The Bluetooth subsystem 310 includes circuitry and resources to provide relatively short-range data communications and related functions. The Bluetooth subsystem 310 includes one or more PLL(s) 312 configured to provide oscillating signals.

The MMWD 300 further includes other resources 314. The other resources 314 can include any circuitry or other means required to support various functions of the MMWD 300. As non-limiting examples, the other resources 314 can include batteries, power conditioning circuitry, operator interfaces, input/output circuitry, Wi-Fi capabilities, etc. Such other resources 314 can further include one or more PLL(s) 316. The MMWD 300 therefore includes at least three distinct wireless operating modes, including cellular, GPS and Bluetooth.

The MMWD 300 further includes control logic 318. The control logic (i.e., circuitry) 318 is configured to receive offset data (i.e., signals) from the cellular subsystem 302. The offset signals correspond to an offset, or apparent shift, in the operating frequency (or carrier) used by the cellular subsystem during instantaneous operations. For example, the offset signals may correspond to a Doppler shift in the apparent operating frequency during operation in an automobile or other vehicle. The offset data signals may also correspond, for example, to a geographic transition between first and second cellular (i.e., wireless) service zones. The offset data signals may further correspond, for example, to the affects of temperature drift, component aging, etc., within the MMWD 300. In any case, the offset data signals provide information to the control logic 318 regarding the instantaneous need, if any, to cause a shift (i.e., change, or transition) in an internally generated reference frequency signal. The control logic 318 is further configured to provide a tuning signal responsive to a determined need to alter the reference frequency.

The MMWD 300 further includes a crystal oscillator (oscillator) 320. The crystal oscillator 320 may, in some circuit implementations, be defined by a temperature compensated voltage controlled crystal oscillator. Other suitable types of variable oscillator may also be used. The oscillator 320 is configured to provide a selectively variable reference frequency signal in accordance with the tuning signal provided by the control logic 318. In one non-limiting implementation, the oscillator 320 includes a varicap diode responsive to the tuning signal issued by the control logic 318. The reference frequency signal from the oscillator 320 is provided in common to the cellular subsystem 302, the GPS subsystem 306, the Bluetooth subsystem 310, and optionally to the other resources 314. In turn, the one or more PLL(s) 304, 308, 312 and/or 316 operate responsive to the reference frequency signal so that various respective functions of the MMWD 300 are performed.

Figure 2B:
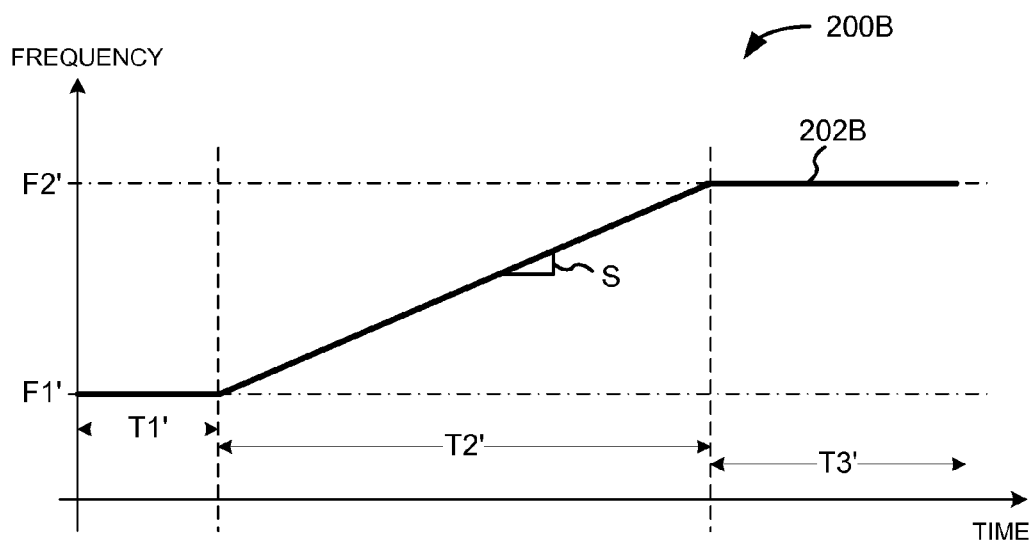

FIG. 2B includes an illustrative and non-limiting signal graph 200B. During operation of the MMWD 300, the oscillator 320 provides a reference frequency signal 202B at an initial value "F1'" during time period "T1'". The reference frequency F1' is presumed to correspond to a determined offset in the (apparent) operating frequency used by the cellular subsystem 302, which is in communication with a cellular service system (e.g., TOWER 1 of FIG. 1, etc.). Control logic 318 then receives an offset signal from the cellular subsystem 302 corresponding to a new offset in the operating frequency due, for example, to a transition from one cellular service zone (e.g. 102, etc.) to another cellular service zone (e.g., 104, etc.).

During time period "T2", the control logic 318 provides a tuning signal characterized, at least in part, by a linear ramping of the signal. That is, at least a portion of the tuning signal is characterized by a time-rate-of-change defining a constant slope. In turn, the oscillator 320 responds to the tuning signal such that the reference frequency signal 204 exhibits a corresponding time-rate-of-change away from the value F1' and toward a new value "F2". The reference frequency signal 202B is characterized in whole or in part by a constant slope (i.e., rise-over-run) "S" during time period T2'.

The cellular subsystem 302 accommodates the transitioning reference frequency 202B during time period T2' using the PLL(s) 304. Such accommodation is typically characterized by incremental stepping, or "detuning", of oscillating signal(s) provided by the PLL(s) 304 while tracking the changing reference frequency 202B. Then, during time period "T3'", the reference frequency 204 establishes equilibrium at the new value F2', in accordance with a constant value tuning signal from the control logic 318.

FIG. 2B depicts a reference frequency signal 202B that changes smoothing and continuously during the time period T2'. However, in one or more implementations, the changing reference frequency 202B may be performed using several discrete steps (or loci) corresponding to a linear (or non-linear) time-rate-of-change. The control logic 318 may be configured to determine the slope S in accordance with a maximum (i.e., optimum) time-rate-of-change tolerable by a subsystem of the MMWD 300.

In one implementation, the time-rate-of-change is determined in accordance with the tolerance(s) (i.e., performance limits) of the GPS subsystem 306. For example, the cellular subsystem 302 may operate smoothly under a peak (or maximum) reference frequency transition rate of 0.17 ppm/second, while the GPS subsystem 306 can only maintain operations under a reference frequency transition rate of 0.05 ppm/second. In another implementation, other performance limits of MMWD 300 are considered in determining the time-rate-of-change. In any case, the control logic 318 determines and implements a changing tuning signal—and thus a changing reference frequency—that allows for all subsystems of the MMWD 300 to operate interruption-free during the transition.

While FIG. 2B depicts an illustrative transitioning reference frequency 202B that increases during time period T2', it is understood that a deceasing reference frequency may also be implemented in accordance with the present teachings. Furthermore, the reference frequency transition may be characterized in whole or in part by a non-linear (i.e., non-constant slope) time-rate-of-change. In any event, the transition in reference frequency is controlled by the control logic 318 such that the maximum (i.e., instantaneous or average) time-rate-of-change corresponds to the operating tolerance(s) of the MMWD 300.

Illustrative Method

Figure 4:
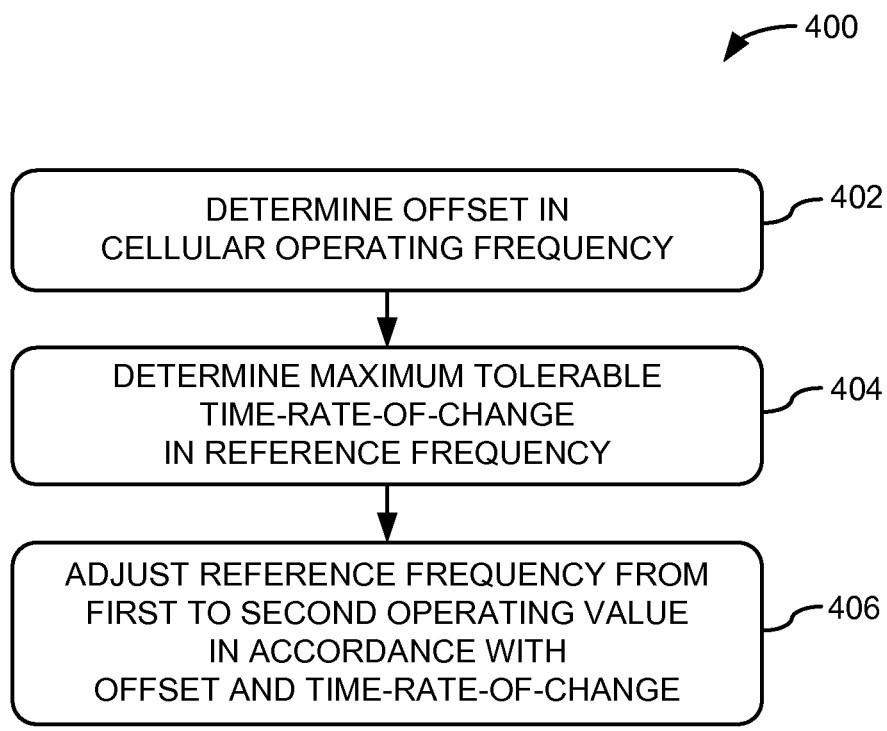
FIG. 4 is a flow diagram depicting a method in accordance with the present teachings.

FIG. 4 is a flow diagram 400 depicting a method in accordance with the present teachings. The method 400 depicts particular steps in a particular order of execution. However, certain steps can be omitted or other steps added, and/or other orders of execution may also be performed, without departing from the scope of the present teachings. The method 400 depicts a flow of distinct and discrete events in the interest of clarity of understanding. However, one of skill in the relevant arts can appreciate that the method 400 can operate in an essentially continuous manner, such that signals flow and/or transition smoothly from one step to the next during processing.

At 402, an offset in cellular operating frequency is determined. The offset can correspond, for example, to a Doppler shift attributable to a transition of a wireless device between cellular (or other wireless) service zones. Other environmental and/or electronic characteristics of the device may be attributable, at least in part, to the determined offset. In any case, a change in reference frequency is required in order to accommodate the offset in operating frequency.

At 404, a maximum (i.e., optimum) tolerable time-rate-of-change in the reference frequency is determined. This maximum rate may be attributable, for example, to a performance limitation (e.g., GPS subsystem, Bluetooth subsystem, etc.) of the wireless device.

At 406, the reference frequency is adjusted from a first operating value to a second operating value (e.g., increase or decrease), in accordance with the offset and in accordance with the determined time-rate-of-change (e.g., total transition over two seconds time, etc.). The adjustment (i.e., controlled transition) of the reference frequency is accommodated by a cellular subsystem (e.g., 302), as needed. Once the transition is completed, the wireless device is presumed to perform normal functions with the reference frequency holding steady until the next required transition.

CONCLUSION

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

The invention claimed is:

1. A method, comprising: operating a multi-modal wireless device comprising wireless subsystems using a reference frequency at a first value for a first extended period of time corresponding to a time operating the wireless device within a first wireless service zone; shifting the reference frequency from the first value to a second value to compensate for one of a Doppler shift, a temperature drift, component aging, and other frequency mismatches, in its cellular subsystem, the shifting characterized at least in part by a controlled transition of the reference frequency at a predetermined time-rate-of-change, wherein the shifting of the reference frequency from the first value to the second value is performed responsive to a transition of the wireless device from the first wireless service zone to a second wireless service zone; and operating the wireless device using the reference frequency at the second value for a second extended period of time corresponding to a time operating the wireless device within the second wireless service zone; wherein the predetermined time-rate-of-change is adjusted based on the total operating tolerances from the wireless subsystems within the wireless device to allow for the wireless subsystems to operate interruption-free during the reference frequency shifting.

2. The method according to claim 1, wherein the first and second wireless service zones are distinct first and second cellular communication service zones.

3. The method according to claim 1, wherein the shifting the reference frequency from the first value to the second value is performed responsive to a Doppler shift in an operating frequency.

4. The method according to claim 1, wherein the predetermined time-rate-of-change corresponds to an operating tolerance of the wireless device.

5. The method according to claim 4, wherein the operating tolerance corresponds to a global positioning system (GPS) subsystem of the wireless device.

6. The method according to claim 1, wherein:
the wireless device includes at least two wireless operating modes; and
the reference frequency is commonly used by the at least two wireless operating modes of the wireless device.

7. The method according to claim 1, further comprising accommodating the shifting of the reference frequency from the first value to the second value using a phase-locked loop of the wireless device.

8. The method according to claim 7, wherein:
the phase-locked loop corresponds to a cellular subsystem of the wireless device; and
the phase-locked loop provides an oscillating signal characterized by incremental stepping in accordance with the shifting of the reference frequency.

9. A method, comprising: operating a multi-modal wireless device comprising wireless subsystems using a first reference frequency for a first extended period of time associated with the wireless device operating within a first wireless service zone; receiving signals corresponding to a wireless operating frequency; adjusting an oscillator in accordance with the received signals so as to transition from the first reference frequency to a second reference frequency to compensate for one of a Doppler shift, a temperature drift, component aging, and other frequency mismatches, in its wireless subsystem, responsive to a transition of the wireless device from the first wireless service zone to a second wireless service zone, the transition performed in accordance with a controlled time-rate-of-change; and operating the wireless device with the second reference frequency for a second extended period of time associated with the wireless device operating within the second wireless service zone; wherein the predetermined time-rate-of-change is adjusted based on the total operating tolerances from the wireless subsystems within the wireless device to allow for the wireless subsystems to operate interruption-free during the reference frequency shifting.

10. The method according to claim 9, wherein the wireless operating frequency corresponds to a cellular service system.

11. The method according to claim 9, wherein the signals correspond to a Doppler shift in the wireless operating frequency.

12. The method according to claim 9, wherein the time-rate-of-change is determined in accordance with an optimum time-rate-of-change.

13. The method according to claim 12, wherein the optimum time-rate-of-change corresponds to an operating tolerance of a portable device.

14. A multi-modal wireless device, comprising: an antenna port configured to receive wireless signals; an oscillator configured to provide a reference frequency; wireless subsystems configured to use the wireless signals and to operate responsive to the reference frequency; and control logic configured to shift the reference frequency from a first value that earlier remained substantially constant for an extended first period of time corresponding to the device operating within a first wireless service zone to a second value that will then remain substantially constant for an extended second period of time corresponding to the device operating within a second wireless service zone to compensate for one of a Doppler shift, a temperature drift, component aging, and other frequency mismatches, in its wireless subsystem, wherein the shift occurs in accordance with a predetermined time-rate-of-change, the control logic further configured to control the shift of the reference frequency in accordance with the wireless signals; wherein the predetermined time-rate-of-change is adjusted based on the total operating tolerances from the wireless subsystems within the wireless device to allow for the wireless subsystems to operate interruption-free during the reference frequency shifting.

15. The device according to claim 14, wherein the shifting is characterized at least in part by a linear ramping of the reference frequency.

16. The device according to claim 14, wherein:
the subsystem is defined by a cellular communications subsystem;
the device further comprises another subsystem configured to operate responsive to the reference frequency; and
the other subsystem is defined by a global positioning system (GPS) subsystem, a wireless local area network (WLAN) subsystem, a Bluetooth subsystem, or a frequency modulated (FM) radio subsystem.

17. The device according to claim 14, wherein the control logic is further configured to shift the reference frequency in accordance with a maximum time-rate-of-change, the maximum time-rate-of-change is based at least in part on operating tolerances of more than one subsystem of the device.

18. The device according to claim 17, wherein the maximum time-rate-of-change corresponds to performance limits of at least two of a GPS subsystem, a cellular subsystem, and a Bluetooth subsystem.

19. The device according to claim 14, wherein:
the subsystem includes a phase-locked loop; and
the subsystem is configured to accommodate the shift in the reference frequency from the first value to the second value using incremental stepping of an oscillating signal provided by the phase-locked loop.

20. The device according to claim 14, wherein the control logic is further configured to shift the reference frequency in accordance with a Doppler shift in the wireless signals used by the subsystem.

* * * * *